R. A. Green,
Corn Planter.
No. 88,382. Patented Mar. 30, 1869.
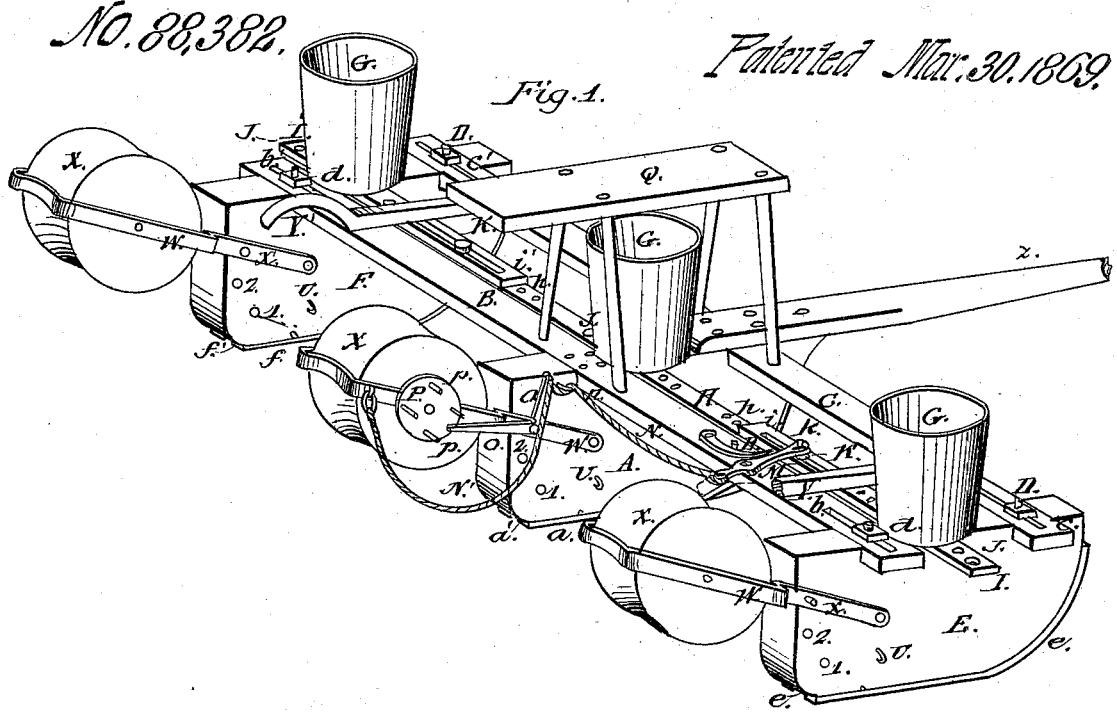
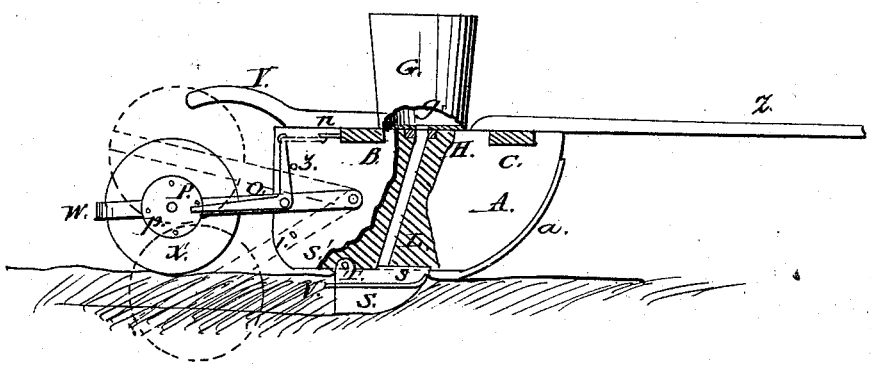
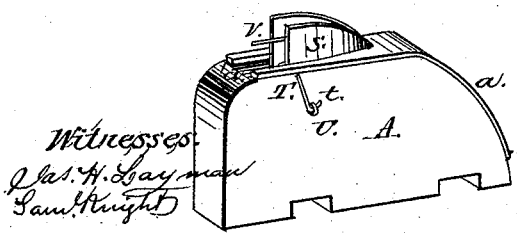
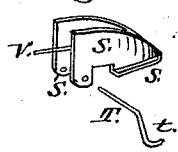
Witnesses:
Jas. H. Layman
Saml. Knight
Inventor:
R. A. Green
By Knight Bro
attys.

ROBERT AMOS GREEN, OF MARTINSVILLE, OHIO.

Letters Patent No. 88,382, dated March 30, 1869.

IMPROVEMENT IN COMBINED MARKER AND PLANTER.

The Schedule referred to in these Letters Patent and making part of the same.

*To whom it may concern:*

Be it known that I, ROBERT AMOS GREEN, of Martinsville, Clinton county, Ohio, have invented a new and useful Combined Marker and Planter; and I hereby declare the following to be a full, clear, and exact description thereof, reference being had to the accompanying drawings, making part of this specification.

This invention relates to an agricultural implement which is capable of being employed either as a marker or planter for corn; and The first part of my improvement consists in making the seed-slide adjustable, so as to bring different-sized openings beneath the hopper, thereby permitting the planting of grains varying in size or number.

The second part of my invention relates to a detachable share, which can be readily connected to the bottom of the runners, when it is desired to convert the implement from a marker into a planter.

In the accompanying drawings—

Figure 1 is a perspective view of a combined marker and planter embodying my improvements, the drawing representing the implement in a condition to be used as a marker.

Figure 2 is a partially-sectionized side elevation of one of the runners, when in condition to be used as a planter.

Figure 3 is a perspective view of one of the runners, and its detachable share, in an inverted position, and Figure 4 is a perspective view of one of the detachable shares.

The central runner A of the implement has rigidly secured to it two stout beams, B C, whose extremities are furnished with slots, $b\ b'$, $c\ c'$, for the reception of bolts, D, which project upwardly from the outer runners E F. This arrangement of slots and bolts admits of the outer runners being adjusted toward or from the central runner, as circumstances may direct, the adjustments being maintained by the nuts $d$.

The runners are shod with irons, $d\ e\ f$, that are slotted at $d'\ e'\ f'$, for a purpose which will be hereafter explained.

Mounted upon the top of each runner are seed-hoppers, G, having apertures, $g$, at their lower ends, for the escape of the grains, whose delivery is regulated in the following manner:

The seed-slide is made in three sections, H I I', and each section is provided with apertures, J, of different dimensions, so as to permit the passage of more or less seed.

The outer sections of the seed-slides are furnished with slots, $i\ i'$, for the reception of bolts, K, which pass through the apertures $h$, of the central section H, and it will be seen that this arrangement of slots, bolts, and apertures, enables the operator to adjust the seed-slides in such a manner as to bring either large or small apertures within the hoppers, so as to adapt the machine for dropping more or less seed, as stated.

After passing through the apertures $g$ and J, the seed drops down channels, L, into the furrows, said channels being located inside the runners, as shown in fig. 2.

The sectional seed-slide is reciprocated in the following manner:

Projecting upwardly from one of the bolts K, is a stud, $k$, which traverses a slot in one end of a lever, M, that is pivoted to beam B, and the outer end of said lever has attached to it a cord, or chain, N, which, after passing through the staple $n$, on the central runner A, is connected to one arm of a bell-crank, O. This bell-crank is operated by the impact of studs $p$, which project from a rotary disk, P, and whenever the bell-crank is depressed by either of said studs, the apertures J of the seed-slide are thereby brought in communication with the apertures $g$ of the hopper, where they become charged with grains, and, on the return-movement of the slide, are brought in communication with the channels L, through which the grains are discharged into the furrow, the spring R causing this return-movement as soon as the bell-crank has escaped from the influence of the stud.

The seed-dropping apparatus can be operated by a person walking behind the machine, or else by the driver, through the medium of an auxiliary cord, N'.

S are the detachable shares, which are adapted to fit within the slots of the runner-irons, and to be retained therein by means of flanges, $s$, and rods, T, which pass through eyes, $s'$, in said shares.

These rods are secured in their proper position by engaging their hooked ends, $t$, with the staples U.

Placed longitudinally of the shares, are deflecting-bars, V, which serve to scatter the grain, and prevent it being deposited in a heap in the furrow.

The rear end of each runner has pivoted to it a swinging frame, W, within which is journalled a concave-faced roller, X, which serves to compress the loose earth around the seed, after the latter has been dropped into the furrow. The rear ends of these frames are bent inward, as shown, so as to act as scrapers for the purpose of cleaning the faces of the rollers. These rollers can be maintained in either an elevated, depressed, or intermediate position, by inserting the pins $x$ in either of the apertures, 1, 2, or 3.

When the implement is to be employed as a marked the rods T are unhooked from the staples U, and withdrawn from the eyes $s'$, after which the detachable shares S are slid out of the slots in the runner-irons.

The frames W are now elevated, and the pins $x$ inserted in the upper aperture 3, which act raises the rollers X clear of the ground, (shown in fig. 1, and also by dotted red lines in fig. 3.)

When the rollers are thus elevated, the dropping-mechanism is inoperative, and the runners serve as markers when the implement is drawn across the field.

When the shares are attached to the runners, the frames W are lowered to the intermediate position shown in fig. 2, and the pin $x$ inserted in the aperture 2, which brings the dropping-mechanism into action, and converts the implement into an effective planter.

By lowering the two outer rollers to the position shown by dotted blue lines in fig. 2, and inserting the pin $x$ into the aperture 1, said rollers are caused to act as ground-wheels, so as to permit the implement to be easily moved from place to place.

Y Y' are handles;

Z, the pole, or tongue of the machine; and

Q, the driver's seat.

I have described the machine as having three runners, but reserve the right to increase the number.

I claim herein as new, and of my invention—

1. The combination, substantially as described, of the central runner A, slotted beams B $b$ $b'$ C $c$ $c'$, bolts D $d$, outer and adjustable runners E F, hoppers G $g$, sectional seed-slide H $h$ I I' $i$ $i'$ J K, channel L, and operating-mechanism M N O P $p$ R, or their equivalents, for the purpose specified.

2. The combination of the runner A $a$ $a'$, detachable share S $s$ $s'$, removable rod T, and staple U, or their mechanical equivalents, for the object stated.

In testimony of which invention, I hereunto set my hand.

ROBERT AMOS GREEN.

Witnesses:
GEO. H. KNIGHT,
JAMES H. LAYMAN.